Aug. 4, 1964      A. T. BLAKE      3,143,014
CORE CUTTER
Filed Aug. 8, 1963
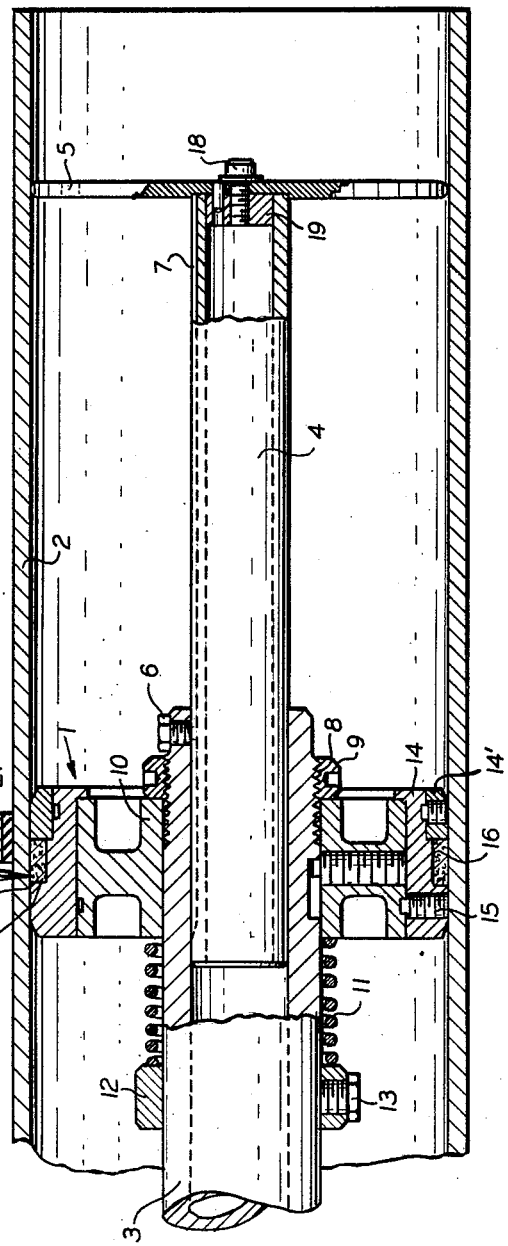
INVENTOR
ARTHUR T. BLAKE
BY
ATTORNEY.

3,143,014
CORE CUTTER
Arthur T. Blake, 57 Ilford Ave., North Arlington, N.J.
Filed Aug. 8, 1963, Ser. No. 300,814
2 Claims. (Cl. 82—101)

The present invention relates to a core cutter in general, and to such core cutter applied to a hollow, cylindrical core, usually made of cardboard. In handling such materials, a spindle or shaft is passed through the core and so-called core chucks are employed to lock the core to a spindle or shaft. The core cutter is subjected to a cutting operation, while the hollow, cylindrical core is subjected to rotation in conventional manner by means of core chucks.

Core cutters have been proposed before, in which a rotary cutter performed the cutting operation against a cutting platen and it has been experienced that the cutting edge of the rotary cutter became dull in a comparatively short time, since it could not be avoided that the cutting edge projected slightly beyond the inner face of the cardboard core to be cut and against the metal surface of the metal platen on which the cardboard core was mounted.

In recognition of these drawbacks, many attempts have been made to avoid the necessity of replacing the rotary cutter within a comparatively short operational time, yet, such means, provided to eliminate these drawbacks, proved not to be successful.

It is, therefore, one object of the present invention to provide a core cutter, which includes means preventing the damage of the edge of the rotary cutter and, thereby, permits a cutting operation by the rotary cutter for a time period, which could not be obtained with the known structures.

It is another object of the present invention to provide a core cutter, which includes a cutting platen equipped with an insert at its outer periphery opposite the rotary cutter made of fibre or similar material, which is of a hardness appreciably less than metal, and does not damage the edge of the rotary cutter upon penetration thereof by the rotary cutter.

It is still another object of the present invention to provide a core cutter, wherein the axis of the rotary cutter is spaced apart from the outer face of the cardboard core for a predetermined radial length by means of at least one cut depth limit roller mounted on the knife support and engaging the outer face of the cardboard core and mounted on the carrier of the rotary cutter.

With these and other objects in view, which will become apparent in the following detailed description, the present invention will be clearly understood in connection with the accompanying drawing, in which:

FIGURE 1 is an axial section of a cutting platen mounted on a telescopically arranged shaft in connection with the mounting of a rotary cutter; and FIG. 2 is a side elevation of the entire device indicating the conventional means for lifting and lowering the rotary cutter from its operative position into its inoperative position.

Referring now to the drawing, the core cutter comprises a platen assembly 1 of a diameter fitting the cardboard core diameter 2 to be cut. The platen assembly 1 is mounted on a first hollow shaft 3, in which a second hollow shaft 4 telescopes, the latter carrying at its free end a core support disc 5. A set screw 6 extending into a longitudinally disposed groove 7 of the second hollow shaft 4 prevents relative rotation between the shafts 3 and 4. The shaft 3 is equipped at one of its free ends with outer thread 8 which receives a nut 9 in order to retain the hub 10 of the platen assembly at any predetermined axial position. A helical spring 11 abuts at one end a setting ring 12 surrounding and secured to the hollow shaft 3 by means of a set screw 13. The other end of the helical spring 11 abuts the hub 10 of the platen assembly and urges the latter always into engagement with a lateral face of the nut 9. The outer ring 14 of the platen assembly 1 surrounds the hub member 10 and is secured to the latter by means of another set screw 15. The outer ring 14 is equipped with an annular recess 16 which is adapted to receive a platen 17, preferably, made of fibre or any other suitable material into which the edge of the rotary cutter bites without damaging an edge formation. A core supporting disc 5 is secured to the end of the shaft 4 by means of a screw bolt 18 received in an end plate 19 provided at the free end of the hollow shaft 4.

A rotary cutter 20 is mounted in conventional manner on a shaft 21, which may be driven by a motor or the like (not shown).

The shaft 21 has an outer thread 22 at its free end, which receives a nut 23 engaging a hub 24 of the rotary cutter 20, which jointly with the nut 23 retains the rotary cutter 20 in its operative position. The rotary cutter 20 engages on the opposite side a set-off portion 25 of larger diameter than that of the shaft 21. A roller bearing 26 is supported by the hub 24, which roller bearing carries an outer ring 27 surrounded by a cut depth limit roller 28. The cut depth limit roller 28 has, preferably, a cover made of pressure-sensitive cork, rubber or some other yielding material, since the position of the rotary cutter 20 relative to the cardboard 2 is determined by the cut depth limit roller 20 which engages the outer face of the cardboard core 2.

The lifting and lowering of the rotary cutter 20 from its operative position into its inoperative position is performed in conventional manner and shown schematically in FIG. 2.

Referring now to FIG. 2, it will be readily seen that the cardboard core 2 is mounted on a base 29 carrying a core chuck 30 in order to rotatably mount the cardboard 2. The rotary cutter 20 is secured on an arm 31 which carries a counter-weight 32 and has a gripping lever 33. By operating manually the gripping lever 33, the rotary cutter 20 can be shifted from its operative position, shown in full line, into its inoperative position, shown in dotted lines.

Due to the fact that a fibre platen 17 slides onto the outer ring 14, which in turn is held by a retainer ring 14', it has been found that the edge of the rotary cutter 20 remains operative for an appreciably long time, which is the multiple of the operational period experienced in known rotary cutters. If the fibre platen 17 extends axially for a certain predetermined length, it is possible to move the outer ring 14 with the fibre platen 17 axially merely by turning the nut 9 and displacing in axial direction the outer ring 14 simultaneously compressing the helical spring 11, so that a different engagement point is brought about between the rotary cutter 20 and the fibre platen 17.

While I have disclosed one embodiment of the present invention, it is to be understood that this embodiment is given by example only and not in a limiting sense, the scope of the present invention being determined by the objects and the claims.

I claim:
1. A core cutter comprising
a platen assembly including a first hollow shaft and a cutting platen axially sliding thereon and adapted to support a cardboard core,
a second shaft telescopically received by said first shaft,
a core support disk secured to the free end of said second shaft and adapted to provide a second support to said cardboard core at a predetermined axial distance from said platen assembly,
means for releasably attaching said core support disk to said second shaft, said cutting platen having an annular recess on its outer periphery,
an annular fibre platen mounted on said cutting platen,
a retainer ring securing said fibre platen to said cutting platen,
a rotary cutter,
a shaft carrying said rotary cutter,
a hub mounted on said shaft,
a ball bearing supported by said hub,
a ring member rotatably mounted on said bearing,
at least one cut depth limit roller having an annular cover of a yielding material and engaging the outer face of said cardboard core during operation of said cutter, and
means for axial adjustment of said cutting platen on said first shaft.

2. The core cutter, as set forth in claim 1, wherein
said axial adjustment means of said cutting platen comprises a ring member releasably secured to said first shaft,
the latter has an outer thread at its free end,
a nut screwed to said outer thread and engaging one end face of said cutting platen, and
a helical spring disposed between said ring member and the other end face of said cutting plate, so that said fibre platen can be moved axially to different positions relative to said rotary cutter.

No references cited.